(12) United States Patent
Pang et al.

(10) Patent No.: US 6,961,120 B2
(45) Date of Patent: Nov. 1, 2005

(54) STRAIN MEASUREMENT MODULE WITH TUNABLE LIGHT GENERATOR AND STRAIN MEASUREMENT SYSTEM USING THE SAME

(75) Inventors: Gi Sung Pang, Taejon (KR); Young Chul Song, Taejon (KR); Ki Soo Kim, Kyunggi-do (KR)

(73) Assignees: Korea Electric Power Corporation, Seoul (KR); Hoseo University, Choongchungnam-do (KR)

( * ) Notice: Subject to any disclaimer, the term of this patent is extended or adjusted under 35 U.S.C. 154(b) by 0 days.

(21) Appl. No.: 10/700,481

(22) Filed: Nov. 5, 2003

(65) Prior Publication Data

US 2005/0094151 A1 May 5, 2005

(51) Int. Cl.$^7$ .............................................. G01N 21/00
(52) U.S. Cl. ..................................................... 356/73.1
(58) Field of Search ................................ 356/73.1, 477, 356/484; 385/12–14, 37; 359/334, 335, 341.31–341.33; 250/227.27, 265, 266, 339.08, 339.12

(56) References Cited

U.S. PATENT DOCUMENTS

| | | | |
|---|---|---|---|
| 6,437,326 B1 * | 8/2002 | Yamate et al. | ............ 250/269.1 |
| 6,674,928 B2 * | 1/2004 | Johnson et al. | ................ 385/12 |
| 6,768,577 B2 * | 7/2004 | Eggleton et al. | ............. 359/335 |
| 6,788,418 B1 * | 9/2004 | Kringlebotn | ................. 356/477 |

* cited by examiner

Primary Examiner—Tu T. Nguyen
(74) Attorney, Agent, or Firm—Antonelli, Terry, Stout and Kraus, LLP.

(57) ABSTRACT

A strain measurement system includes a tunable light generator, a coupler, a fiberoptic sensor unit, and an optical detector. The tunable light generator includes a Super Luminescent light emission Diode (SLD), and a tunable Fabry-Perrot (FP) filter cascaded to an output terminal of the SLD to convert light having a wideband spectrum into discrete optical signals. The coupler receives and distributes the optical signals and passes them to a wavelength compensation device which detects wavelengths of the optical signals. The fiberoptic sensor unit receives the optical signals from the tunable light generator through the coupler and transmits a response signal corresponding to a variation of strain attributable to load. The optical detector detects the response signal output from the fiberoptic sensor through the coupler.

18 Claims, 6 Drawing Sheets

STRAIN MEASUREMENT MODULE WITH TUNABLE LIGHT GENERATOR AND STRAIN MEASUREMENT SYSTEM USING THE SAME

BACKGROUND OF THE INVENTION

1. Field of the Invention

The present invention relates generally to strain measurement systems, and more particularly to a strain measurement module and strain measurement system using the strain measurement module, which is used to monitor a structure while collecting the strain information of the structure using a light generator and a fiberoptic sensor.

2. Description of the Related Art

A conventional strain gauge used to diagnose the condition of a structure is disadvantageous in that it does not have durability sufficient to be used for the diagnosis of the structure, a measurement cooper wire must be provided in each of sensors, and it may influence the structure in the case of many measurement points because power must be supplied to measure resistance. For these reasons, various attempts have been made to replace the conventional strain gauge system with the fiberoptic sensor.

Figure 1:
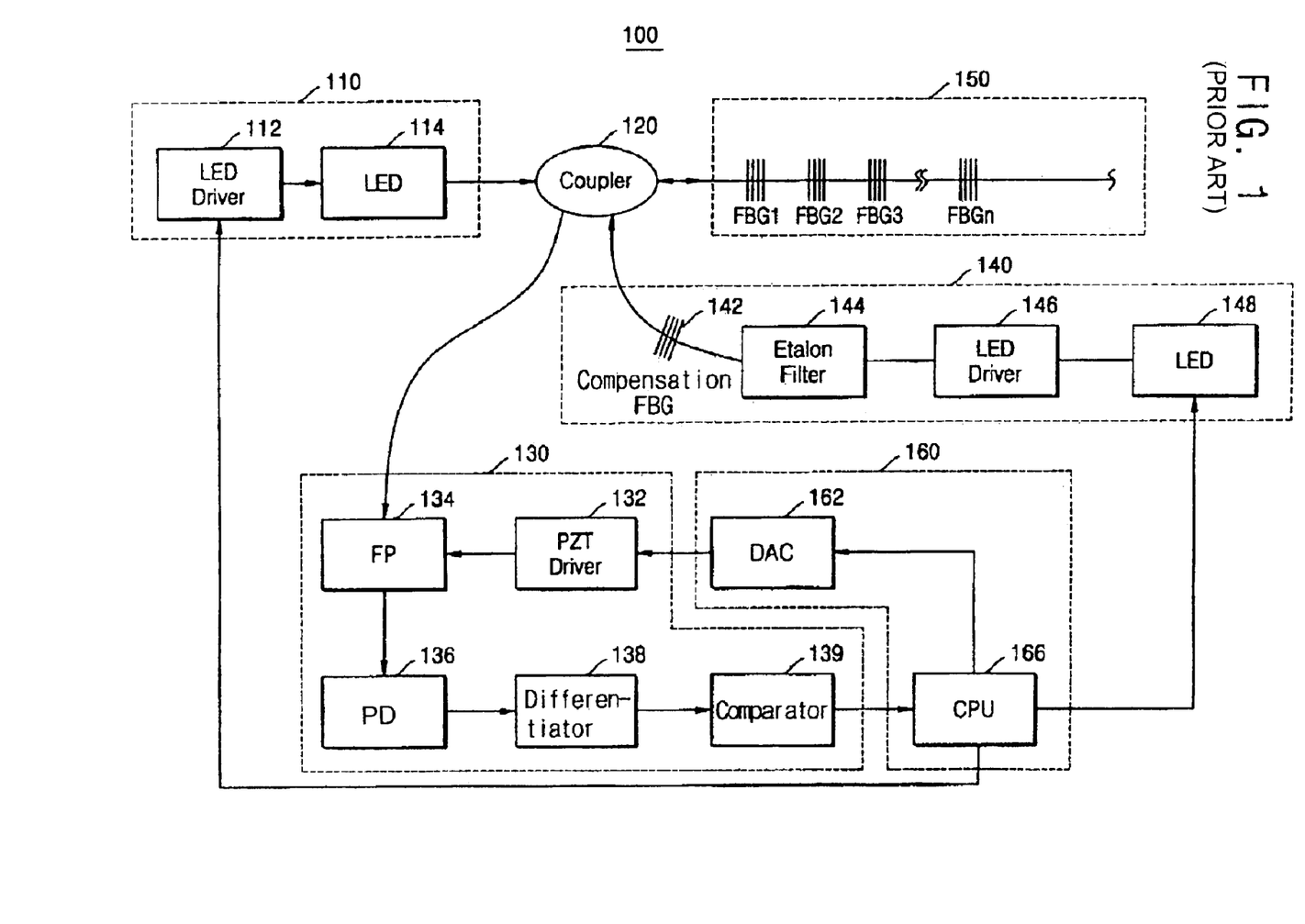
FIG. 1 is a schematic diagram showing the construction of a conventional strain measurement system using an LED as a light source.

FIG. 1 is a schematic diagram showing the construction of a conventional strain measurement system 100 using a fiberoptic sensor.

As shown in FIG. 1, the conventional strain measurement system 100 using the fiberoptic sensor includes a light generator 110, an optical detection unit 130, a compensation unit 140, a fiberoptic sensor unit 150 and a control unit 160.

The operation of the conventional strain measurement system 100 shown in FIG. 1 is described below.

A Light Emitting Diode (LED) driver 112 constituting a part of the light generator 110 supplies power to an LED 114 to generate light having a certain wavelength distribution. The generated light passes through a coupler 120 and proceeds to the fiberoptic sensor unit 150 attached to or embedded in a structure.

Although a variety of fiberoptic sensors may be used as the fiberoptic sensor unit 150, FIG. 1 depicts an example in which Fiber Bragg Grating (FBG) sensors are used. Each of the FBG sensors reflects wavelengths of a certain width satisfying the Bragg's condition and passes the remaining wavelengths therethrough.

The reflected light reflected by the FBG sensor because it satisfies a certain wavelength condition proceeds to the optical detection unit 130 through the coupler 120. The optical detection unit 130 passes only the reflected light of a certain wavelength therethrough using a Fabry-Perrot (FP) filter 134 and transfers the reflected light to an optical detector, such as a Photo Diode (PD) 136. The FP filter 134 is provided therein with a lead-zirconate titanate (PZT) element (not shown) to be synchronized with the wavelength of the reflected light. Through the adjustment of the length of the PZT element depending on the extension and contraction of a cavity located in the FP filter 134, the passage of the reflected light passes through the FP filter 134 is controlled. In order to control the extension and contraction of the PZT element as described above, the FP filter 134 is connected to a PZT driver 132.

As described above, the PD 136 measures and outputs the intensity of reflected light. While the output from the PD 136 passes through a differentiator and a comparator, the peak point of the reflected light is detected and intensity is calculated at the peak point. The calculated intensity is input to a Central Processing Unit (CPU) 166.

The CPU 166 detects the wavelength of the reflected light from a voltage value that is applied to the PZT driver 132 when the reflected light is detected. From the value of the detected wavelength, the variation of strain generated in the FBG sensor can be calculated.

To compensate for the non-linearity of a voltage-length relationship that the PZT element of the FP filter 134 has, the compensation unit 140 including an Ethalon filter 144 may be added to the system. The compensation unit 140 is constructed to include an LED 146, an LED driver 148, the Ethalon filter 144 and a compensation FBG 142, and is connected to the coupler 120. The light output from the LED 146 by the operation of the LED driver 148 is transferred to the coupler 120 through the Ethalon filter 144 and the compensation FBG 142. The optical detection unit 130 measures the intensity of light in the same manner as in the reception operation of the reflected light, and transfers the measured intensity to the CPU 166. The CPU 166 utilizes the output value detected in the optical detection unit 130 to compensate for the wavelengths of the reflected light transmitted from the fiberoptic sensor unit 150.

In the above-described system, the construction and operation of the FBG 142, the FP filter 134 and the Ethalon filter 144 are well known to those skilled in the art. Accordingly, detailed descriptions of those are omitted here.

Since the above-described conventional strain measurement system is provided with the LED having a low output that is used as a light signal, it is not easy to measure a signal. In particular, for architectural structures, the transmission distance of a signal is long, so that it is almost impossible to measure the signal. Furthermore, the conventional strain measurement system using the LED as a light source is disadvantageous in that it must be provided with a plurality of FP filters corresponding to a plurality of FBG sensors in the case where the plurality of FP filters are embedded at a plurality of locations.

Figure 2:
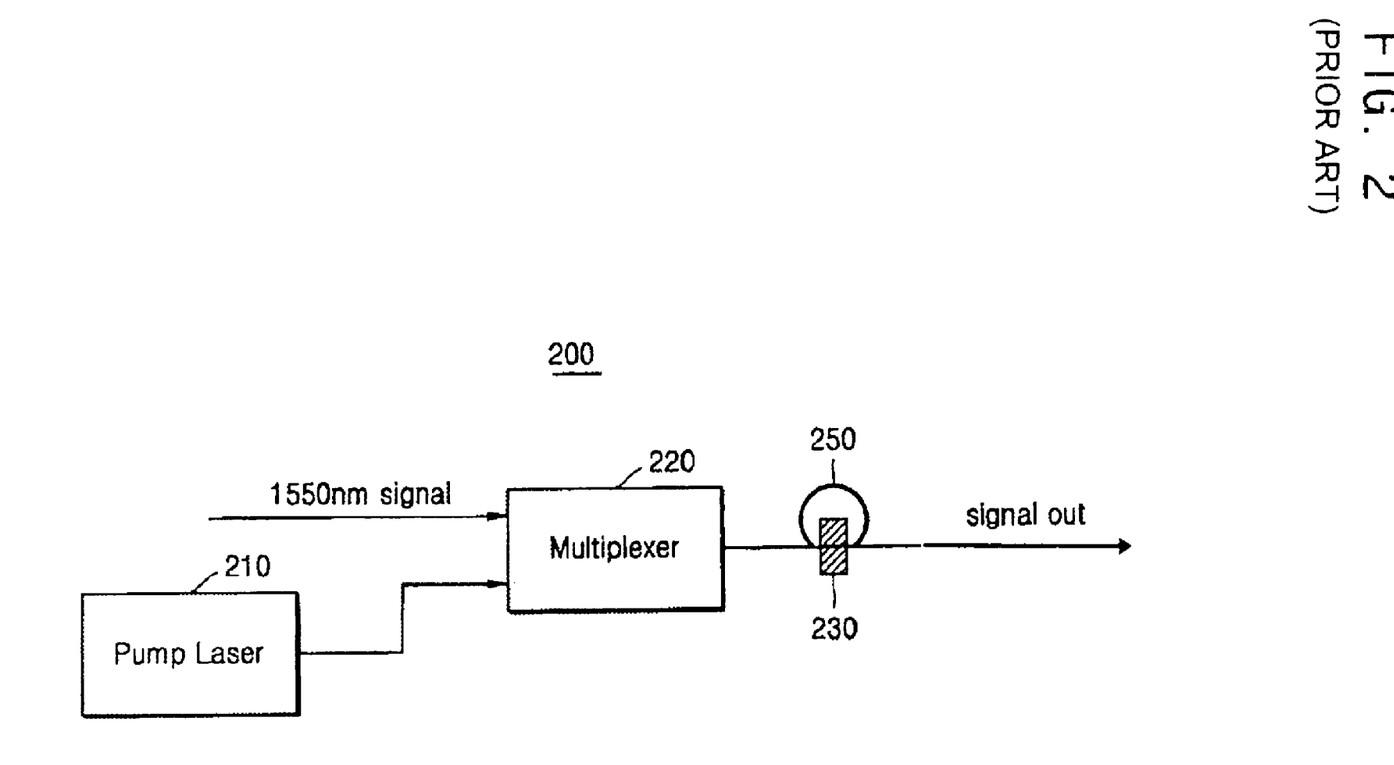
FIG. 2 is a schematic diagram showing the construction of a conventional tunable laser generator.

In order to overcome the above-described problems, there was proposed another conventional strain measurement system equipped with a tunable laser generator in which a high output laser and an FP filter were disposed at a source stage. The tunable laser generator of this system uses an Erbium Doped Fiber Amplifier (EDFA) as an amplifying mechanism, which is illustrated in FIG. 2.

The operation of the tunable laser generator is described with reference to FIG. 2 below. Weak signal light of about 1550 nm and a laser beam of 1480 nm generated in a pump laser 210 are joined together in a multiplexer 220, and the joined signal light and laser beam are transferred to a fiberoptic amplifier 250. The laser beam transferred to the fiberoptic amplifier 250 excites erbium ions $Er^{3+}$ to an upper level, while the signal light causes erbium ions to transition to a lower level. In this process, light of 1550 nm is induction-emitted and is joined with the signal light. The intensified signal light excites other erbium ions again so that further intensified light is emitted. The light amplified during circulation through the fiberoptic amplifier 250 passes through an FP filter 230 and is output as a laser signal having a certain wavelength.

As described above, the tunable laser generator overcomes a limitation in the transmission distance of a signal and simplifies the structure of a reception unit, but has many other problems.

The tunable laser generator is disadvantageous in that it must be provided with the laser diode and the multiplexer because it must use the laser beam as well as the signal light as input signals, an area that optical fiber occupies is large and, thus, causes the system to be complicated because amplification is performed in the optical fiber, and the temperature control of the laser generator is difficult. Furthermore, since the laser beam has high polarization and coherency compared with general light, an interference phenomenon is serious in an optical detector. Additionally, high manufacturing costs are incurred to apply the laser generator to the strain measurement system.

The strain measurement system using the tunable laser generator has a high output and can simplify the structure of the optical detector. However, the strain measurement system is problematic in that the structure of a source stage, that is, the laser generator, is complicated, the control of temperature is difficult, the fabrication of a high-precision system is difficult because a laser beam having high polarization and coherency is used as a signal, and the manufacturing costs of the system are high, compared with the strain measurement system using the LED as a light source. As a result, there has been a demand for a strain measurement system that is capable of overcoming the above-described problems.

Meanwhile, the two conventional strain measurement systems using optical fiber use the FP filter in the optical detector or laser generator. However, the FP filter is problematic in that it is sensitive to the variation of temperature. However, the conventional strain measurement systems do not provide any countermeasure to this problem.

SUMMARY OF THE INVENTION

Accordingly, the present invention has been made keeping in mind the above problems occurring in the prior art, and an object of the present invention is to provide a strain measurement module and strain measurement system, which have simple structures, can be manufactured at low costs, and can perform high-precision measurement.

Another object of the present invention is to provide a strain measurement system and strain measurement system, which can reduce the variations of characteristic values due to the variation of temperature.

Still another object of the present invention is to provide a strain measurement module and strain measurement system, which are suitable for the case where a plurality of fiberoptic sensors are disposed at a plurality of locations to measure strain.

In order to accomplish the above object, the present invention provides a strain measurement system, including a tunable light generator comprising a SLD, and a tunable FP filter cascaded to an output terminal of the SLD to convert light having a wideband spectrum, which is generated in the SLD, into discrete optical signals having central wavelengths at regular intervals; a coupler for receiving and distributing the optical signals output from the tunable light generator; wavelength compensation means for receiving the optical signals from the tunable light generator through the coupler and detecting wavelengths of an optical signal output from the tunable light generator and passed through the FP filter; a fiberoptic sensor unit for receiving the optical signals from the tunable light generator through the coupler and transmitting a response signal corresponding to a variation of strain attributable to load; and an optical detector for detecting the response signal output from the fiberoptic sensor through the coupler.

In the present invention, the fiberoptic sensor unit may be a FBG sensor unit. In the case where the FBG sensor is used, the present invention may further include a reference FBG sensor between the coupler and the FBG sensor unit to provide a reference value used for wavelength calculation of the FBG sensor unit. In the present invention, the wavelength compensation means may include an Ethalon filter and a second optical detector.

Additionally, in the present invention, the FP filter may be provided with a thermistor and a thermoelectric element to allow temperature of the FP filter to be controlled. The SLD may be also provided with a thermistor and a thermoelectric element to allow temperature of the SLD to be controlled.

The present invention can be easily applied to the case where a plurality of optical sensors are disposed at a plurality of locations. In this case, the present invention provides a strain measurement system, including a tunable light generator comprising a SLD, and a tunable FP filter cascaded to an output terminal of the SLD to convert light having a wideband spectrum, which is generated in the SLD, into discrete optical signals having central wavelengths at regular intervals; a first coupler for receiving and distributing the optical signals output from the tunable light generator; a wavelength compensation means for receiving the optical signals from the tunable light generator through the first coupler and detecting wavelengths of an optical signal output from the tunable light generator and passed through the FP filter; a plurality of second couplers for receiving and distributing the optical signal output from the tunable light generator and passed through the first coupler; a plurality of fiberoptic sensor units connected to the plurality of second couplers to receive the optical signals output from the tunable light generator and transmitting response signals corresponding to variations of strain attributable to load; and a plurality of first optical detectors connected to the plurality of second couplers to detect the response signals output from the fiberoptic sensors.

The strain measurement module and strain measurement system of the present invention have simple structures, can be manufactured at low costs, and can perform high-precision measurement using the tunable light generator.

The strain measurement system and strain measurement system of the present invention are each provided with a means for controlling the temperature of the FP filter, thus providing temperature stability and high-precision measurement.

The strain measurement system and strain measurement system of the present invention can be applied to the case where a plurality of fiberoptic sensors are disposed at a plurality of locations to measure strain because a Super Luminescent light emission Diode (SLD) is used as a light source, and enable the structure of a reception stage to be simplified because the FP filter is installed at a light generator side.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 3:
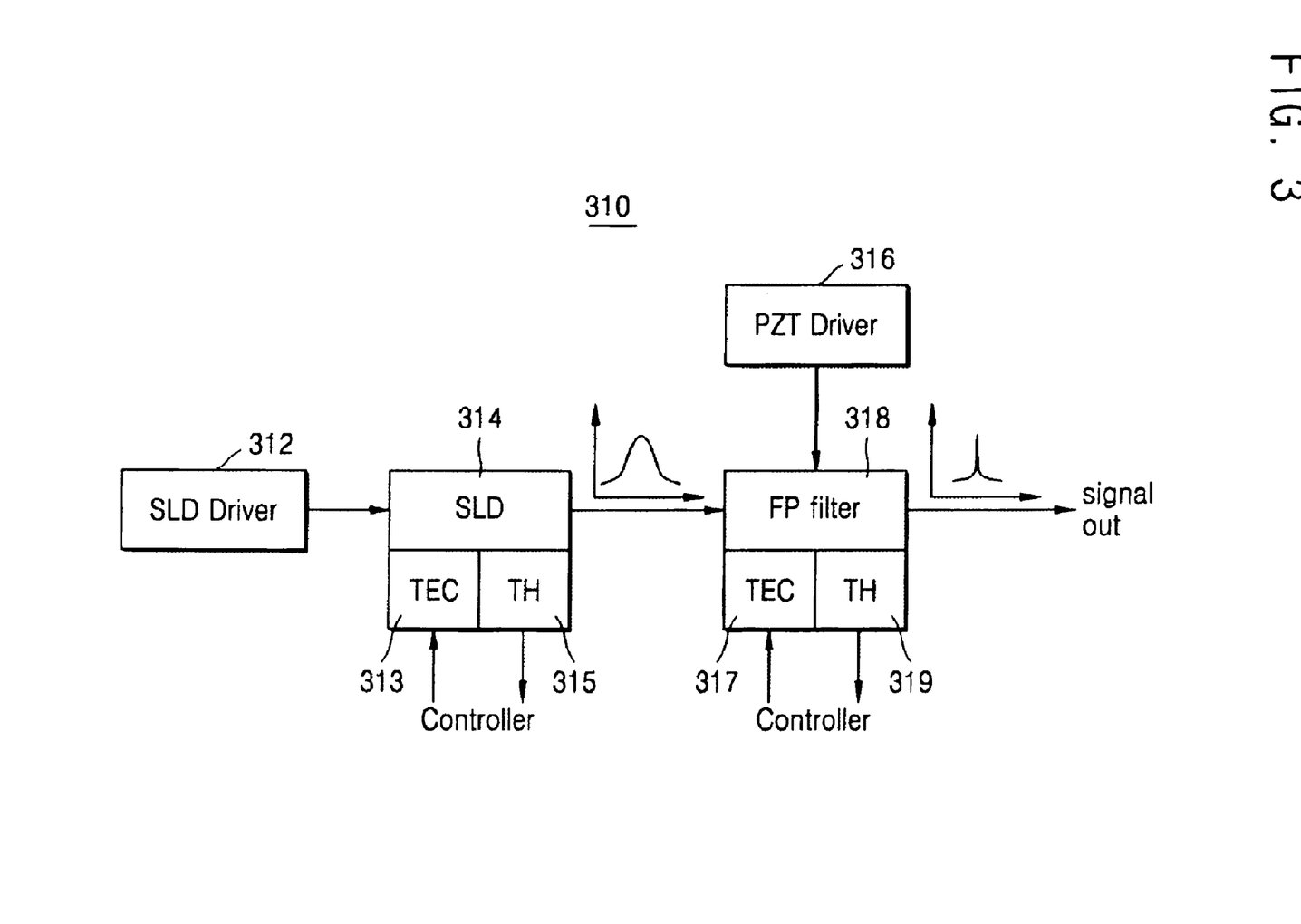
FIG. 3 is a view showing a tunable light generator used in a strain measurement module and strain measurement system in accordance with an embodiment of the present invention.

FIG. 3 is a view showing a tunable light generator 100 used in a strain measurement module and a strain measurement system using the strain measurement module in accordance with an embodiment of the present invention.

As shown in the drawing, the tunable light generator 100 of the present invention employs a SLD 314 as a light source. The SLS 314 is driven by a SLD driver 312. The SLD 314 generates light having a broadband spectrum, which has a short coherency length and is unpolarized compared with a laser beam. The SLS 314 has an output range of 1 mW, which is greater than that (about 50 μW) of an LED. Accordingly, even in the case where an optical loss may be incurred because a transmission distance is lengthened, the SLD 314 is suitable for a light source.

The light having a wideband spectrum, which is emitted from the SLD 314, is directed to a filter means, such as a FP filter 318. Although not shown, the FP filter 318 is formed of two coated mirror surfaces positioned at the ends of two strands of optical fiber and a cavity positioned between the two coated mirror surfaces, and functions as a resonator that passes light of certain wavelengths, which are defined by the length of the cavity (the interval between the two mirror surfaces), therethrough. As described above, the light that has passed through the FP filter 318 has a peak that has a very small Full Width Half Maximum (FWHM).

The FP filter 318 is equipped with a means for varying the wavelengths of transmitted light by adjusting the length of the cavity, for example, a PZT element (not shown). The PZT element adjusts the length of the cavity by being extended or contracted depending on the magnitude of voltage supplied from the PZT driver 316. The PZT driver 316 supplies waveform voltage, that is, saw tooth voltage, which repeatedly increases by a certain magnitude, for example, 0.01 V, within a range of −10 V to +10 V as time elapses, to the PZT element at regular intervals. As a result, the FP filter 318 converts the light having a wideband spectrum, which is generated from the SLD 314, into a discrete optical signal having central wavelengths that are spaced apart from each other at certain intervals corresponding to the intervals of voltages applied from the PZT element, and continuously outputs the discrete optical signal.

As described above, the tunable light generator 310 of the present invention is characterized in that it employs the SLD as a light source, and is provided with the FP filter 318 that is cascaded to the output end of the SLD and can vary transmitted wavelengths. However, the present invention is not limited to this construction, and provides an FP filter structure that overcomes the defective in which the FP filter has characteristics sensitive to temperature.

In more detail, the FP filter 318 has a variation of a transmitted central wavelength of about 1 nm according to a variation of temperature of 1° C. This phenomenon is attributable to the temperature dependency of the PZT element used to control the length of the cavity of the FP filter 318. The influence of the temperature dependency of the FP filter on the strain measurement system may be described in connection with a Free Spectral Range (FSR). The FSR refers to each of ranges (repeated intervals) in which the transmitted wavelength characteristics of the FP filter are repeatedly exhibited, and actually restricts wavelength ranges in which the FP filter can be used. For example, in the case where a light source having a central wavelength of 1550 nm is used, the FSR is about 50 nm. Accordingly, the variation of the transmitted wavelength (1 nm/° C.) depending on the temperature variation of the central wavelength is great compared with that of the FSR (that is, 50 nm). Accordingly, inconvenience arises in that a correction process is necessary to compensate for the temperature variation.

The temperature dependency of the FP filter causes another problem. As described above, the light generated in the light source has a wide spectrum approximate to the Gaussian distribution. For example, the output light of the SLD has a FWHM of 45 nm and the Gaussian distribution. When the variation of temperature is applied to the FP filter when such a light source is employed, the transmitted wavelength range transitions. That is, light of a higher-intensity wavelength range does not pass through the FP filter, while light of a lower-intensity wavelength range passes through the FP filter. A decrease in the intensity of an optical signal influences the reception sensitivity of the optical detection unit and, thus, makes the stable and precise measurement of wavelengths difficult.

For this reason, the FP filter 318 is provided with a temperature measurement sensor, such as a thermistor 316, and a temperature regulator, such as a thermoelectric element 317, so as to uniformly control the temperature of the FP filter 318. The temperature of the FP filter 318 measured by the thermistor 319 is transmitted to a controller, and the controller controls the temperature of the FP filter 318 within a certain range by operating the thermoelectric element 317. A microprocessor can be used as the controller.

Additionally, the SLD 314 is provided with a thermistor 315 and a thermoelectric element 313 to further weaken the temperature dependency of the tunable light generator. The operation of the thermistor 315 and the thermoelectric element 313 is the same as that of those of the FP filter.

Figure 4:
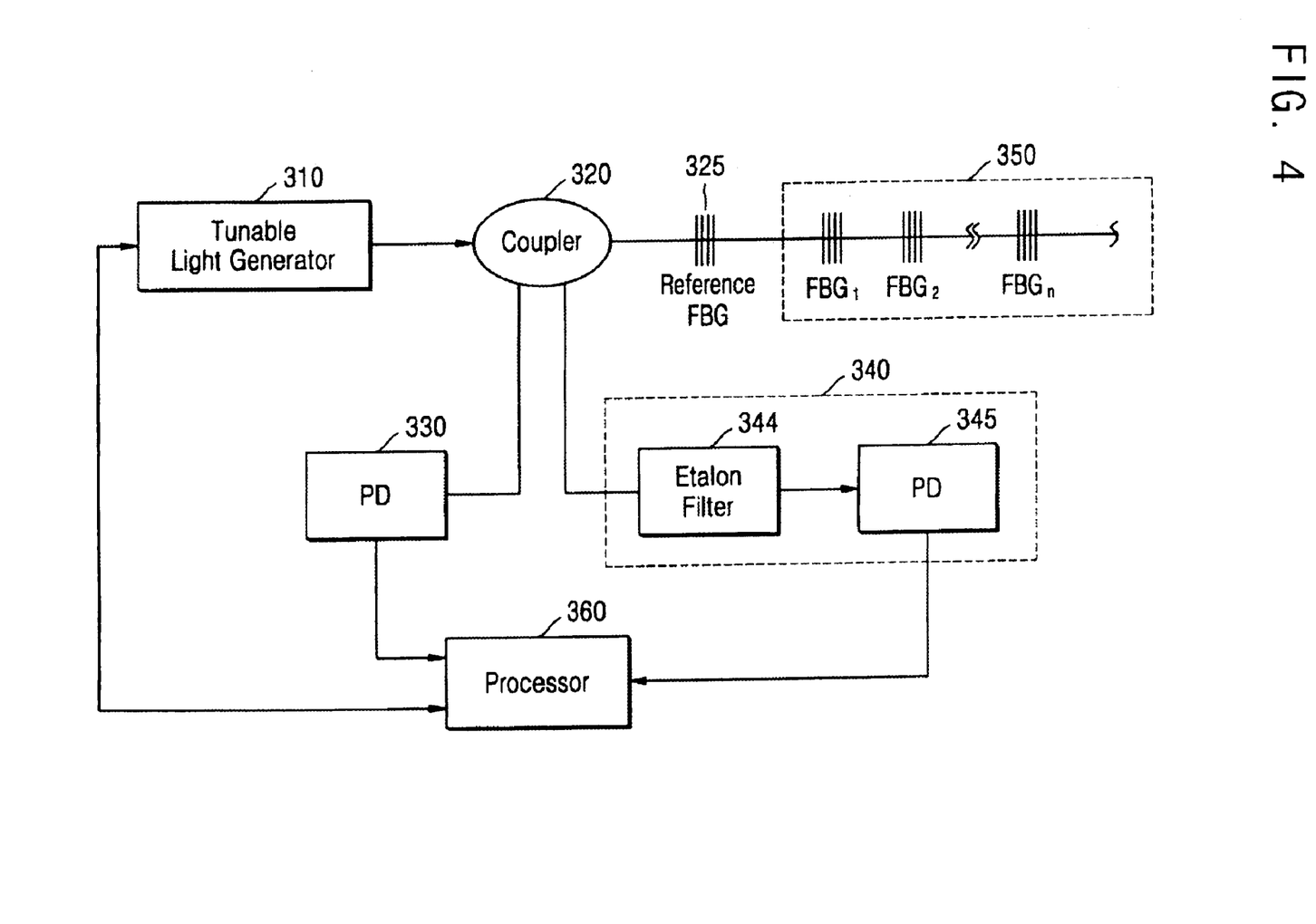
FIG. 4 is a schematic diagram showing a strain measurement system using the tunable light generator of FIG. 3.

FIG. 4 is a schematic diagram showing a strain measurement system using the tunable light generator 310 described in conjunction with FIG. 3.

Referring to FIG. 4, the strain measurement system includes the tunable light generator 310, a coupler 320, a sensor optical detector 330, a wavelength compensation means 340 and a processor 360.

As described above, the tunable light generator 310 includes the SLD 314 and the tunable FP filter 318 cascaded to the SLD 314. The FP filter 318 and the SLD 314 may be each connected to the thermistor 319 or 315 and the thermoelectric element 317 or 313.

The optical signal generated from the tunable light generator 310 to have a low FWHM and be discrete at regular intervals proceeds to a reference FBG sensor 325 and a FBG sensor unit 350 through the coupler 320. Of the optical signal, a response signal reflected because it coincides with the grating interval of the reference FBG sensor 325 and the FBG sensor unit 350, that is, the reflected light, passes through the coupler 320 and is detected by the sensor optical detector 330.

A part of the optical signal generated in the tunable light generator 310 proceeds to the wavelength compensation means 340 through the coupler 320. The wavelength compensation means 340 compensates for the non-linearity of a voltage-length relationship that the FP filter 318 of the tunable light generator 310 has, and calculates the precise wavelength of the response signal, that is, the reflected light, output from the FBG sensor unit 350. As shown in FIG. 4, the wavelength compensation means 340 includes an Ethalon filter 344 and a compensation optical detector 345. As well known to those skilled in the art, the Ethalon filter 344 has the characteristic of passing therethrough light of corresponding wavelengths at regular wavelength intervals (for example, 100 GHz in terms of frequencies). The light passed through the Ethalon filter 344 is detected by the compensation optical detector 345. The optical signal detected by the compensation optical detector 345 is used to calculate the wavelengths of the light detected in the sensor optical detector 330 as described later.

In FIG. 4, the processor 360 that controls the operation of the tunable light generator 310, the sensor optical detector 330 and the compensation optical detector 345 is shown. The processor 360 controls the SLD driver 312, the thermistors 315 and 319 and the thermoelectric elements 313 and 317, and calculates the intensity and wavelengths of the reflected light output from the FBG sensor unit 350 and detected by the sensor optical detector 330. The processor 360 may be provided with Analog to Digital (AD) converter or Digital to Analog (DA) converter to control the components 310, 330 and 340 constituting parts of the strain measurement system of the present invention. Of course, the AD converter or DA converter may be provided in each of the components 310, 330 and 340 in the form of a separate part.

As described above, the processor 360 functions to calculate the wavelengths of the reflected light detected by the sensor optical detector 330 using the optical signal measured by the wavelength compensation means 340. To this end, appropriate software may be installed on the processor 360.

The remaining components of the strain measurement system described in conjunction with FIG. 3 except for the FBG sensor unit 350, that is, the tunable light generator 310, the coupler 320, the wavelength compensation means 340, the sensor optical detector 330, the reference FBG sensor 325 and the processor 360, may be provided in the form of a strain measurement module. The reference FBG sensor 325 is preferably provided in the strain measurement module so as to be prevented from being influenced by weight. In this case, the strain measurement module is provided with slots (not shown) to connect with the reference FBG sensor 325 and the FBG sensor unit. Meanwhile, in the case where the processor 360 is not contained in the strain measurement module but is implemented by a Personal Computer (PC), the strain measurement module is provided with an interface to communicate with the PC.

Since the strain measurement module and strain measurement system of the present invention described in conjunction with FIG. 4 use the light generated from the tunable light generator 310, interference is considerably reduced, and the reflected light output from the FBG sensor unit 350 can be precisely and stably detected because the temperature of components having high temperature dependency, that is, the FP filter 318 and the SLD 314, is uniformly maintained, compared with a conventional EDFA system using laser.

Hereinafter, a process of calculating the wavelengths of reflected light detected by the sensor optical detector 330 using the strain measurement system shown in FIG. 4, and the particular advantages of the present invention are described. As described above, in the calculation of the reflected light, compensation for the non-linearity of the FP filter must be taken into consideration. This point is described with reference to actual experimental data obtained by calculating the optical signals detected by the sensor optical detector and the compensation optical detector.

The light of the SLS used in an experiment had an input of 1 mw, a central wavelength of 1550 nm, and an FWHM of 45 nm. The FP filter used in the experiment had an insertion loss of 2.13 dB and an FSR of 50.526 nm. The FWHM of the optical signal output from the FP filter was 56 pm. The FP filter was operated so that voltage was applied to the PZT element of the FP filter while repeatedly increasing by 0.01 V within a range of −10 to +10 V. During the operation of the FP filter, temperature was uniformly maintained. For the FBG sensor, there was employed one having wavelengths of a band of 1550 nm, a self length of 2.0 cam, a line width smaller than 0.2 nm, and a reflectivity of 90%. For the Ethalon filter, there was used a thin film filter that passes therethrough a peak wavelength at every 100 GHz. The insertion loss of the thin film filter was 1 dB, and the loss of the thin film filter was −11.8 dB in a band rejection region.

Figure 5:
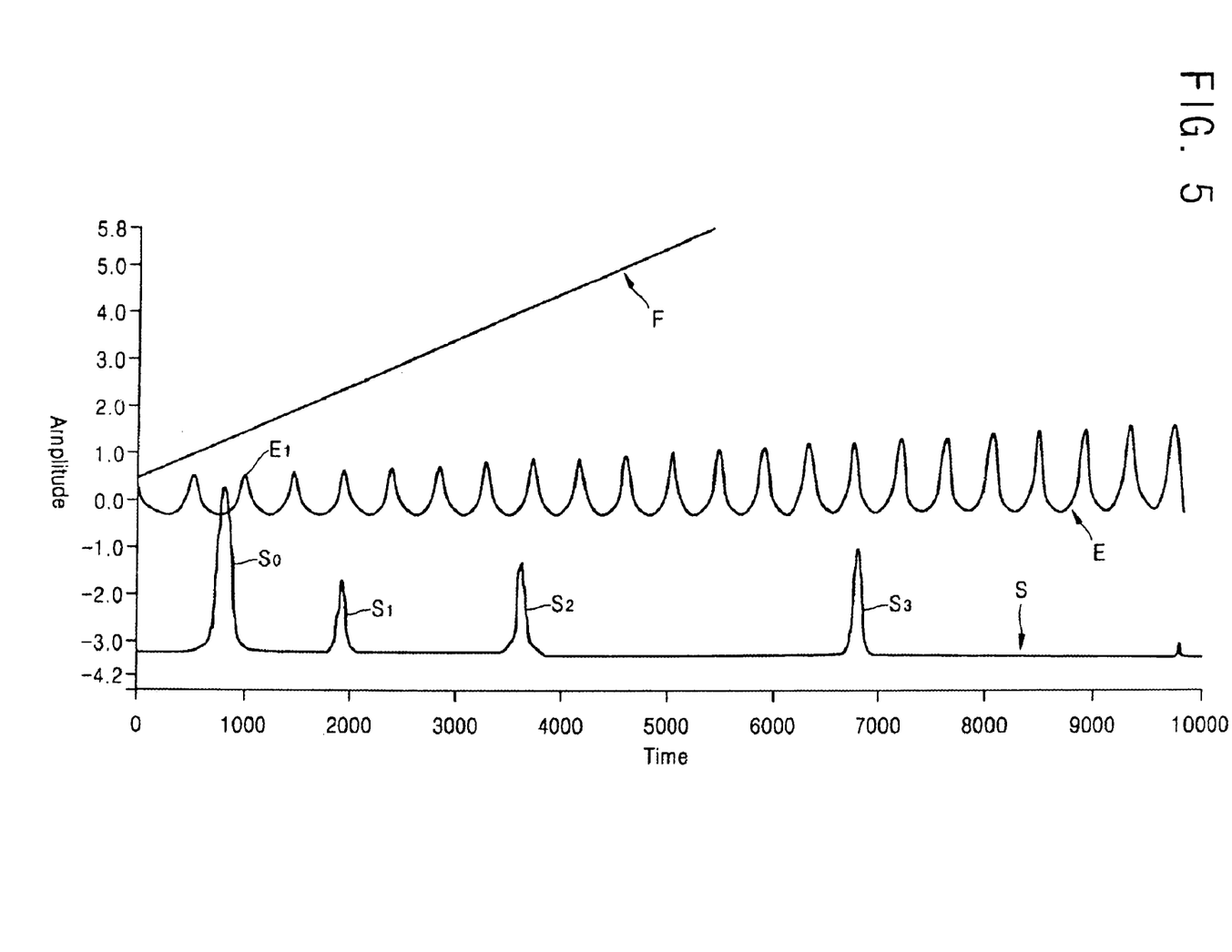
FIG. 5 is a graph showing optical signal data waveforms obtained in a compensation optical detector and a sensor optical detector after being passed through an Ethalon filter as time elapses.

FIG. 5 is a graph showing optical signal data obtained in the compensation optical detector 345 and the sensor optical detector 330 after being passed through the Ethalon filter 344 as time elapses. For reference, voltages applied to the FP filter are shown as well. In the graph, the physical properties are normalized values.

In FIG. 5, a waveform indicated by reference character S relates to optical signals reflected from the FBG 325 and the FBG sensor unit 350. In the waveform S, a first peak S0 represents an optical signal reflected by the reference FBG sensor 325, and following peaks S1 to S3 represent optical signals reflected by component sensors FBG1, . . . , and FBGn constituting the FBG sensor unit 350. A waveform indicated by reference character E represents the output optical signal of the tunable light generator 310 detected after being passed through the Ethalon filter 344. A curve indicated by reference character F shows driving voltage applied to the FP filter 318 as time elapses.

As described above, the first peak S0 of the waveform S indicates the reflected light reflected by the reference FBG sensor 325, whose wavelength is known. Additionally, since, according to the transmission characteristics of the Ethalon filter 344, the peaks of the waveform E are formed at regular intervals, the wavelength of the peak E1 of the waveform E adjacent to the first peak S0 of the waveform S can be found from the wavelength of the first peak S0 of the waveform S. If the wavelength of the peak E1 is found, the wavelengths of all the peaks of the waveform E can be found. In this case, the wavelengths of the second to fourth peaks S1 to S3 of the waveform S can be found on the assumption that a proportional relationship exists between each of the peaks S1 to S3 and the wavelength of the peak of the waveform E adjacent to the peaks S1, S2 or S3.

The method of the present invention is considerably effective compared with the conventional strain measurement system, in view of the structures of the wavelength compensation means and the optical detector. As described in conjunction with FIG. 1, in the conventional strain measurement system, the compensation unit 140 is provided with another light source 146, so that the optical detector 136 must be used to measure not only a reflected light output from the FBG sensor unit 150 but also a light signal output from the compensation unit 140. As a result, the optical detector 136 must alternately measure the reflected light and the optical signal and, thus, causes delays in measurement. However, since, in the present invention, the waveform compensation unit 340 comprised of the Ethalon filter 344 and the compensation optical detector 345 is employed, reflected light and an optical signal can be measured at the same time.

Figure 6:
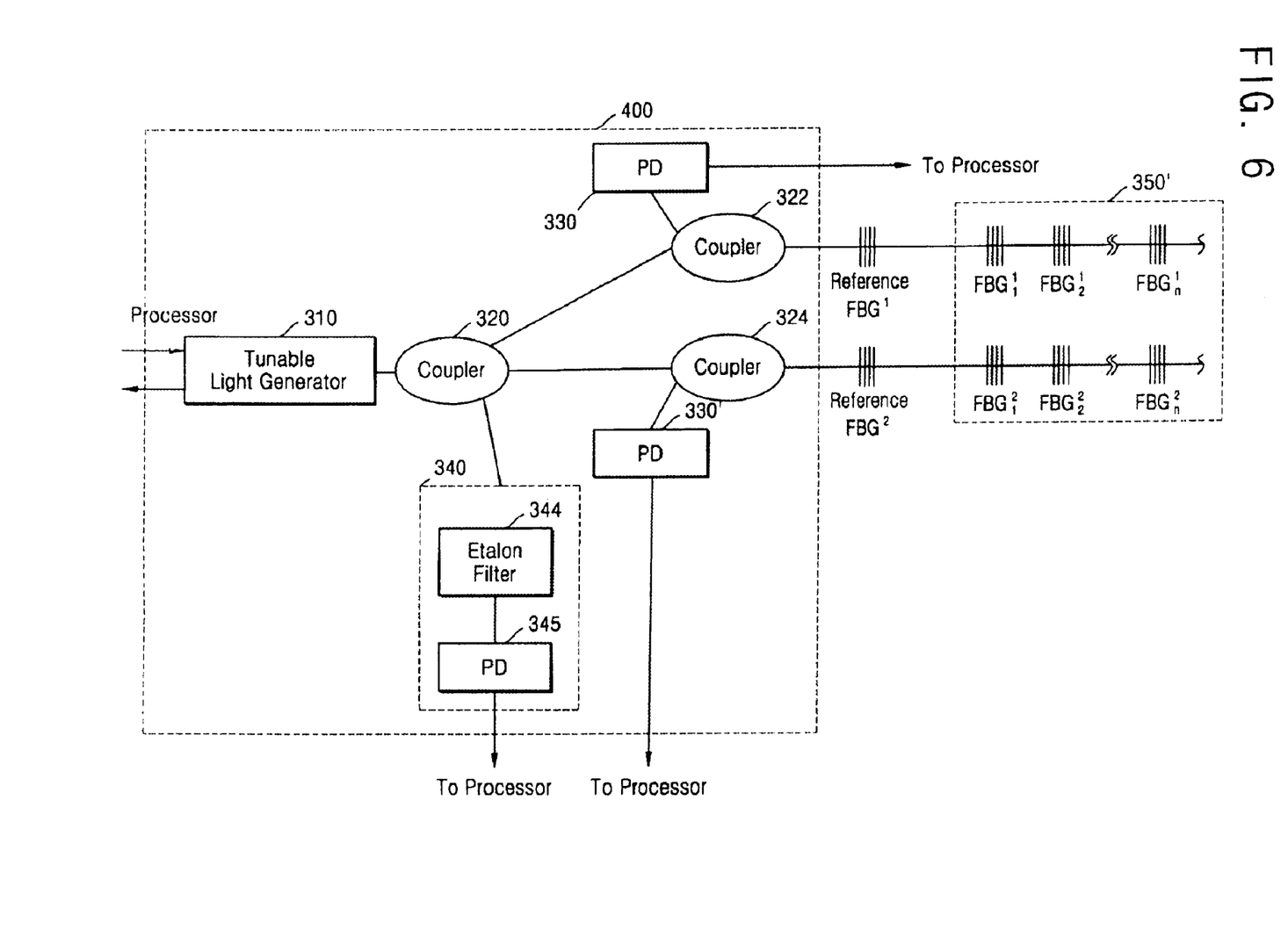
FIG. 6 is a schematic diagram showing a strain measurement system equipped with a plurality of FBG sensor units to detect strain at a plurality of locations in accordance with another embodiment of the present invention.

FIG. 6 is a schematic diagram showing a strain measurement system equipped with a plurality of FBG sensor units to detect strain at multiple locations in accordance with another embodiment of the present invention.

In FIG. 6, the construction and operation of a tunable light generator 310, a first coupler 320 and a wavelength compensation means 340 are similar to those of FIG. 4. In the system of FIG. 6, two FBG sensor units, that is, a FBG sensor unit 1 (FBG11, FBG12, ..., and FBG1n) and a FBG sensor unit 2 (FBG21, FBG22, ..., and FBG2n), constitute a collection of FBG sensor units 350'. Two second couplers 322 and 324 are required to connect the collection of FBG sensor units 350' with the tunable light generator 310. Additionally, a reference FBG sensor 1 and a reference FBG sensor 2 are included to provide reference wavelengths with respect to reflected light output from the two FBG sensor units. Of course, it is not necessary to provide reference FBG sensors of a number proportional to the number of the FBG senor units, but a single reference FBG sensor may be provided for a plurality of FBG sensor units.

Although FIG. 6 illustrates the case where the two FBG sensor units are disposed at two different locations, the present invention is not limited to this. It will be apparent to those skilled in the art that the inventive concept of the present invention can be easily applied to the case where three or more FBG sensor units are disposed.

The strain measurement system described in conjunction with FIG. 6 has particular advantages compared with the conventional strain measurement system. In the conventional strain measurement system, it is impossible to perform measurement through a plurality of FBG sensor units disposed at various locations because the output of a light source is low, and an FP filter must be provided in each of optical detectors even though the plurality of FBG sensor units are disposed. However, as shown in FIG. 6, when the tunable light generator 310 of the present invention is used, light signals output from a plurality of FBG sensor units can be detected using a signal FP filter.

The remaining components of the strain measurement system described in conjunction with FIG. 6 except for the collection of FBG sensor units 350' may be provided in the form of a strain measurement module. In this case, appropriate slots (not shown) may be added to connect with the collection of FBG sensor units 350', and an interface may be provided in the strain measurement module to communicate with a PC in the case where the PC functions as the processor.

As described above, the strain measurement system of the present invention has been described with reference to FIGS. 4 and 6. Since a method of obtaining actual strain, which an optical sensor experiences, from the wavelength of reflected light obtained through the above-described process can be easily calculate by those skilled in the art based on the properties of optical fiber, a description of the method is omitted here.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A strain measurement system, comprising:
    a tunable light generator comprising a Super Luminescent light emission Diode (SLD), and a tunable Fabry-Perrot (FP) filter cascaded to an output terminal of the SLD to convert light having a wideband spectrum, which is generated in the SLD, into discrete optical signals having central wavelengths at regular intervals;
    a coupler for receiving and distributing the optical signals output from the tunable light generator;
    wavelength compensation means for receiving the optical signals from the tunable light generator through the coupler and detecting wavelengths of an optical signal output from the tunable light generator;
    a fiberoptic sensor unit for receiving the optical signals from the tunable light generator through the coupler and transmitting a response signal corresponding to a variation of strain attributable to load; and
    an optical detector for detecting the response signal output from the fiberoptic sensor unit through the coupler.

2. The strain measurement system as set forth in claim 1, wherein the tunable FP filter is provided with a thermistor and a thermoelectric element to allow temperature of the tunable FP filter to be controlled.

3. The strain measurement system as set forth in claim 1, wherein the SLD is provided with a thermistor and a thermoelectric element to allow temperature of the SLD to be controlled.

4. The strain measurement system as set forth in claim 1, wherein the fiberoptic sensor unit is a Fiber Bragg Grating (FBG) sensor unit.

5. The strain measurement system as set forth in claim 4, further comprising a reference FBG sensor between the coupler and the FBG sensor unit to provide a reference value used for wavelength calculation of the FBG sensor unit.

6. The strain measurement system as set forth in claim 1, wherein the wavelength compensation means comprises an Ethalon filter and a second optical detector.

7. A strain measurement system, comprising:
    a tunable light generator comprising a SLD, and a tunable FP filter cascaded to an output terminal of the SLD to convert light having a wideband spectrum, which is generated in the SLD, into discrete optical signals having central wavelengths at regular intervals;
    a first coupler for receiving and distributing the optical signals output from the tunable light generator;
    a wavelength compensation means for receiving the optical signals from the tunable light generator through the first coupler and detecting wavelengths of an optical signal output from the tunable light generator;
    a plurality of second couplers for receiving and distributing the optical signal output from the tunable light generator and passed through the first coupler;
    a plurality of fiberoptic sensor units connected to the plurality of second couplers to receive the optical signals output from the tunable light generator and transmitting response signals corresponding to variations of strain attributable to load; and
    a plurality of first optical detectors connected to the plurality of second couplers to detect the response signals output from the fiberoptic sensor units.

8. The strain measurement system as set forth in claim 7, wherein the tunable FP filter is provided with a thermistor and a thermoelectric element to allow temperature of the tunable FP filter to be controlled.

9. The strain measurement system as set forth in claim 7, wherein the wavelength compensation means comprises an Ethalon filter and a second optical detector.

10. A strain measurement module for detecting signals relating to strain, which a plurality of external fiberoptic sensors experience, output from the plurality of external fiberoptic sensors, comprising:

a tunable light generator comprising a SLD, and a tunable FP filter cascaded to an output terminal of the SLD to convert light having a wideband spectrum, which is generated in the SLD, into discrete optical signals having central wavelengths at regular intervals;

a coupler for receiving and distributing the optical signals output from the tunable light generator;

a wavelength compensation means for receiving the optical signals from the tunable light generator through the coupler and detecting wavelengths of an optical signal output from the tunable light generator; and an optical detector connected to the coupler to detect a response signal corresponding to a variation of strain attributable to load from the plurality of external fiberoptic sensors as response to the optical signal output from the tunable light generator.

11. The strain measurement system as set forth in claim 10, wherein the tunable FP filter is provided with a thermistor and a thermoelectric element to allow temperature of the tunable EP filter to be controlled.

12. The strain measurement system as set forth in claim 10, wherein the SLD is provided with a thermistor and a thermoelectric element to allow temperature of the SLD to be controlled.

13. The strain measurement system as set forth in claim 10, wherein the fiberoptic sensor unit is a FBG sensor unit.

14. The strain measurement system as set forth in claim 13, further comprising a reference FBG sensor between the coupler and the FBG sensor unit to provide a reference value used for wavelength calculation of the FBG sensor unit.

15. The strain measurement system as set forth in claim 10, wherein the wavelength compensation means comprises an Ethalon filter and a second optical detector.

16. A strain measurement module for detecting signals relating to strain, which a plurality of external fiberoptic sensors experience, output from the plurality of external fiberoptic sensors, comprising:

a tunable light generator comprising a SLD, and a tunable FE filter cascaded to an output terminal of the SLD to convert light having a wideband spectrum, which is generated in the SLD, into discrete optical signals having central wavelengths at regular intervals;

a first coupler for receiving and distributing the optical signals output from the tunable light generator;

wavelength compensation means for receiving the optical signals from the tunable light generator through the first coupler and detecting wavelengths of an optical signal output from the tunable light generator;

a plurality of second couplers for receiving and distributing the optical signal output from the tunable light generator and passed through the first coupler; and a plurality of first optical detectors connected to the plurality of second couplers to detect response signals corresponding to variations of strain attributable to load from the plurality of external fiberoptic sensors.

17. The strain measurement system as set forth in claim 16, wherein the tunable FP filter is provided with a thermistor and a thermoelectrid element to allow temperature of the tunable FP filter to be controlled.

18. The strain measurement system as set forth in claim 17, wherein the wavelength compensation means comprises an Ethalon filter and a second optical detector.

* * * * *